Feb. 28, 1961
H. E. FOLLETT
2,972,974
HYDROFOIL CRAFT
Filed July 23, 1956
8 Sheets-Sheet 1
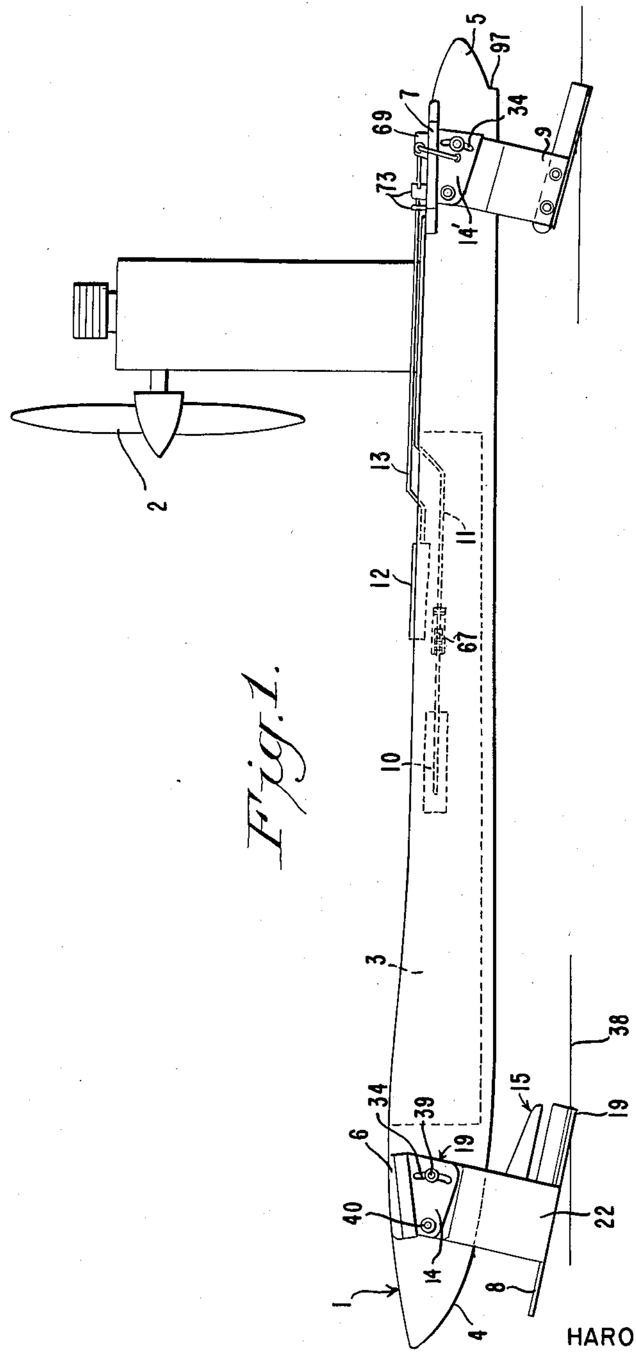
INVENTOR
HAROLD E. FOLLETT
BY C. W. Mortenson
ATTORNEY

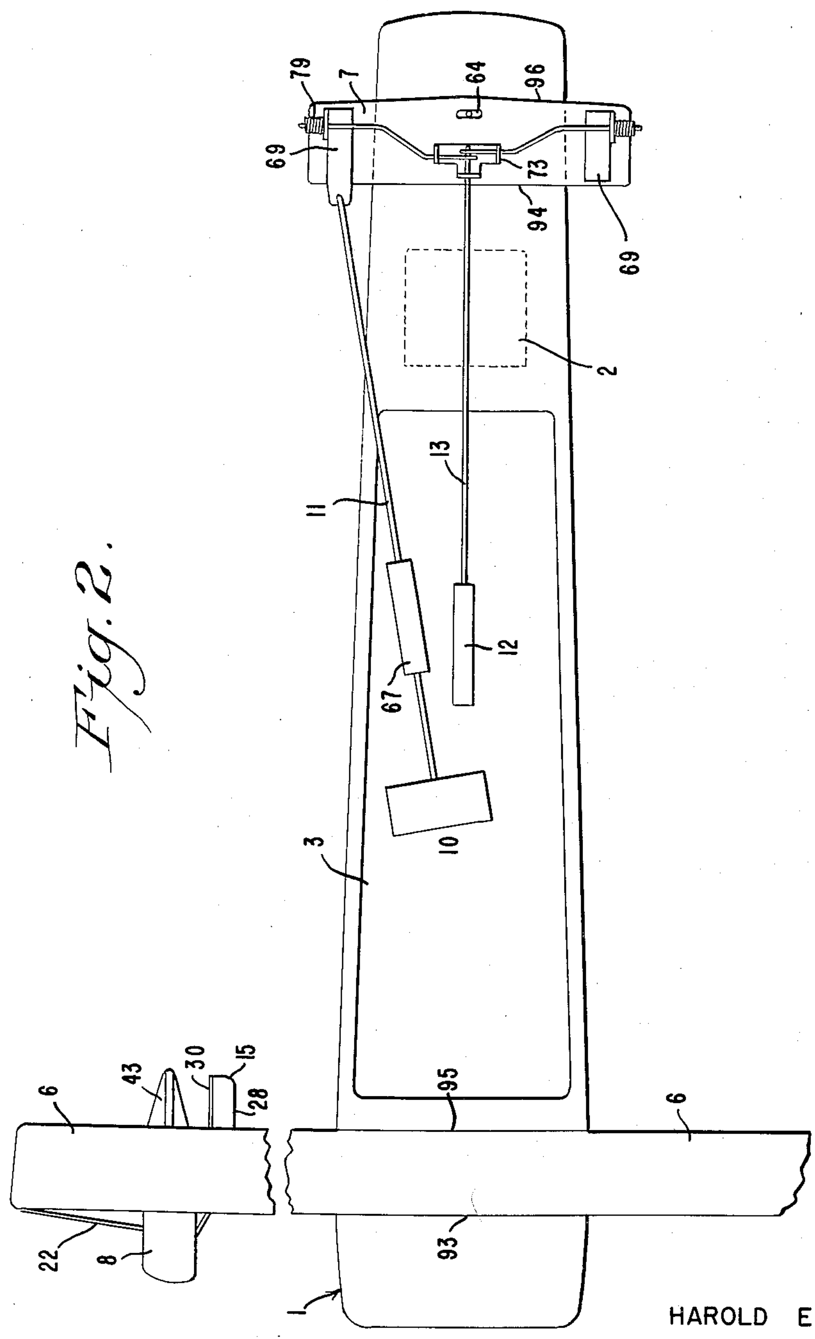
INVENTOR
HAROLD E. FOLLETT
BY C. H. Mortenson
ATTORNEY

Feb. 28, 1961 H. E. FOLLETT 2,972,974
HYDROFOIL CRAFT
Filed July 23, 1956 8 Sheets-Sheet 3
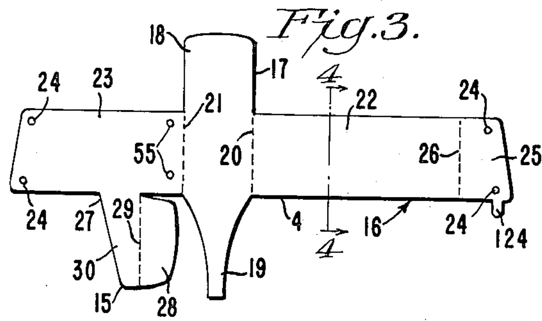
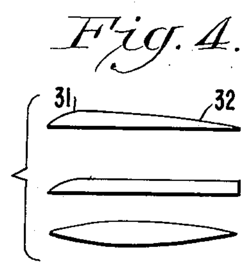
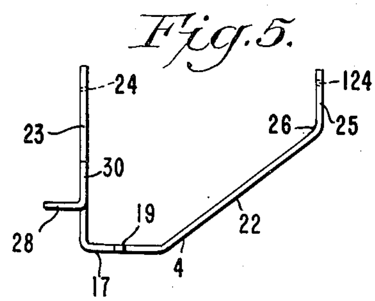
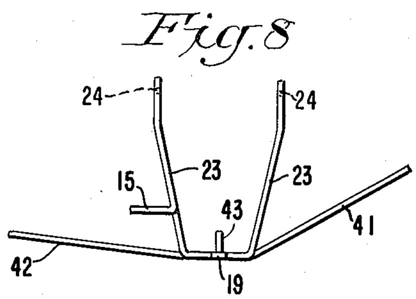
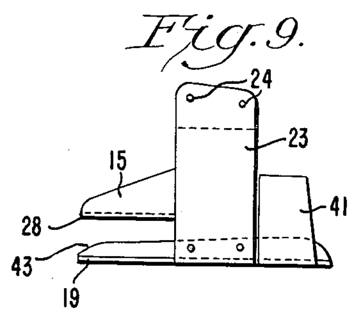
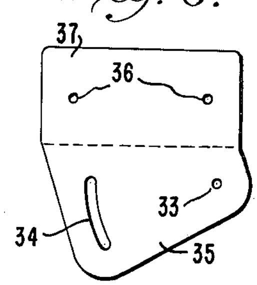
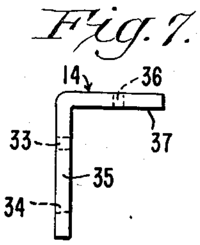
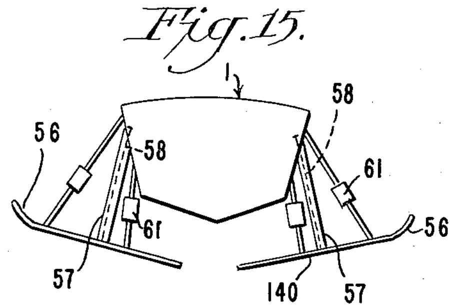
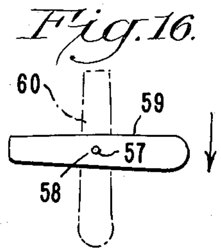
INVENTOR
HAROLD E. FOLLETT
BY C. W. Mortenson
ATTORNEY Feb. 28, 1961 H. E. FOLLETT 2,972,974
HYDROFOIL CRAFT
Filed July 23, 1956
8 Sheets-Sheet 4
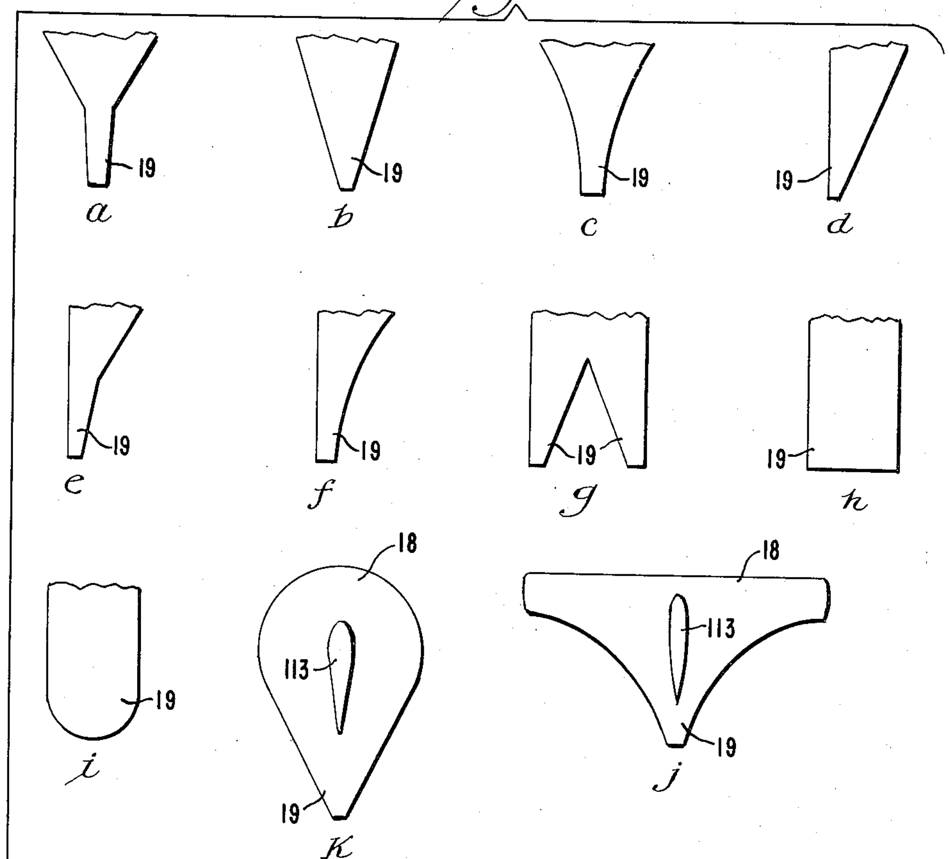
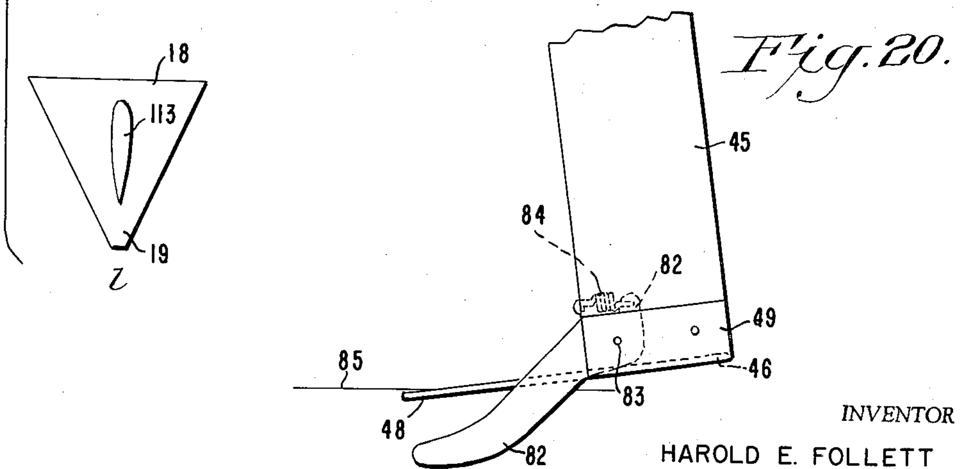
INVENTOR
HAROLD E. FOLLETT
BY C. W. Mortenson
ATTORNEY

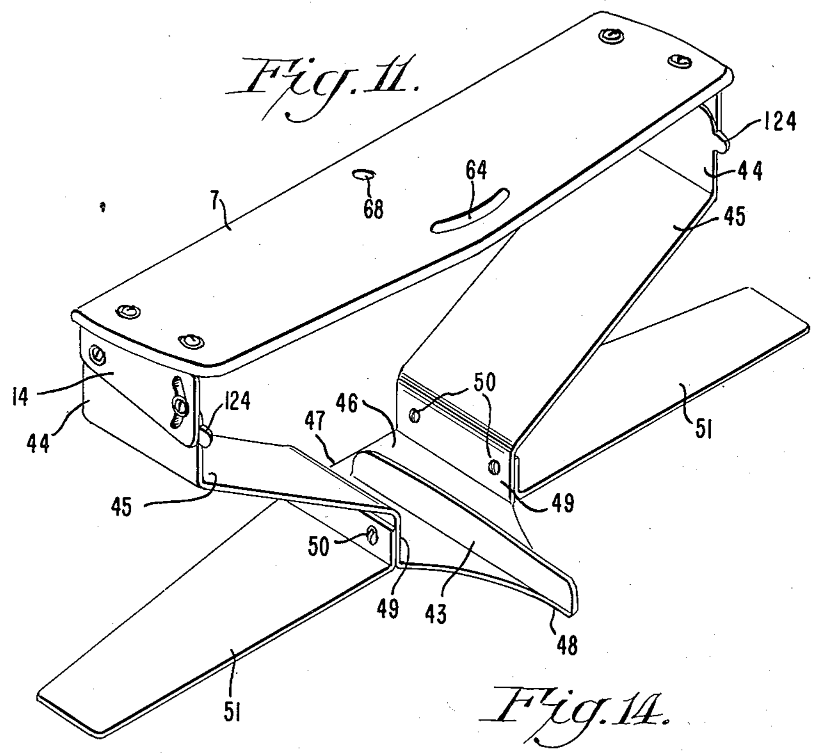
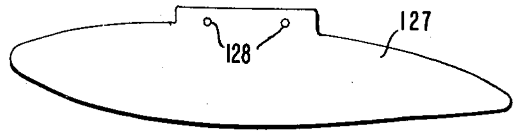
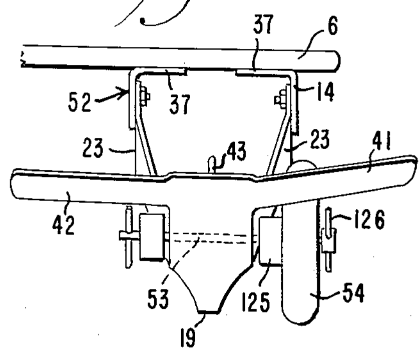
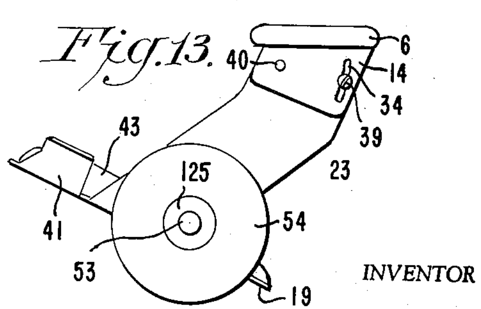
INVENTOR
HAROLD E. FOLLETT
BY C. H. Mortenson
ATTORNEY

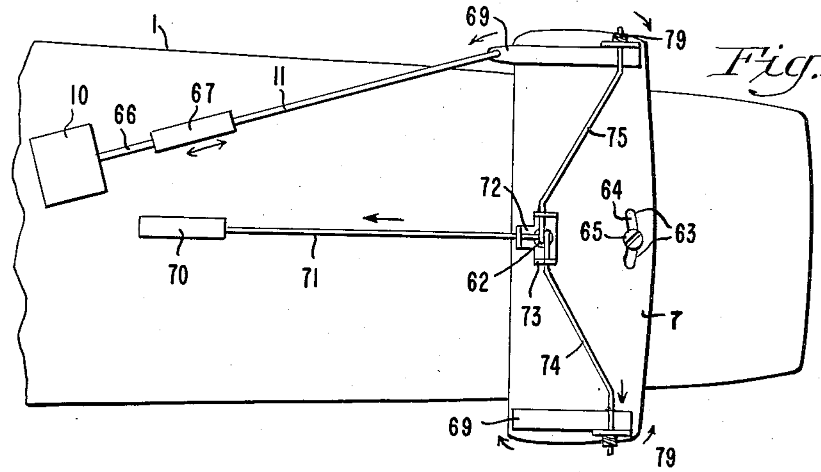
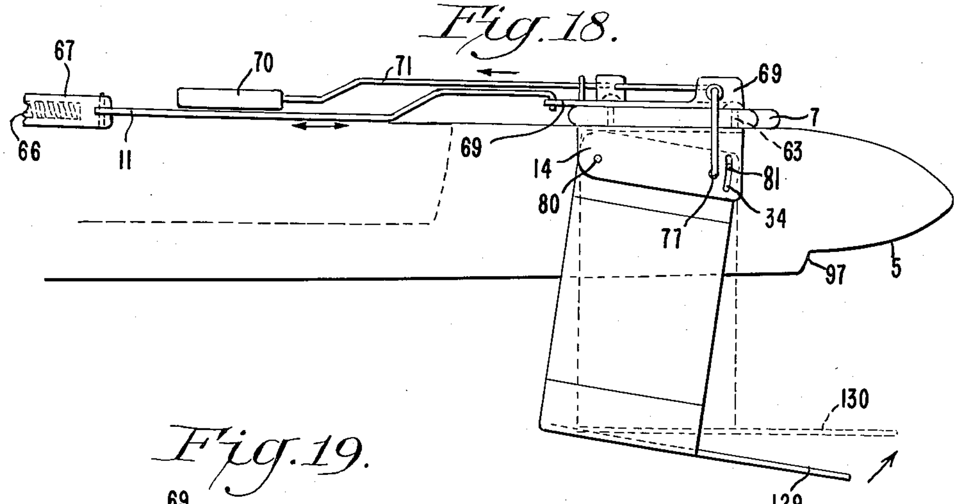
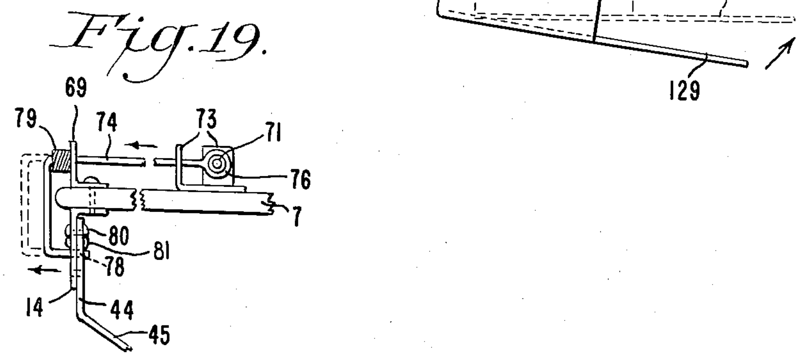
INVENTOR
HAROLD E. FOLLETT
BY C. W. Mortenson
ATTORNEY

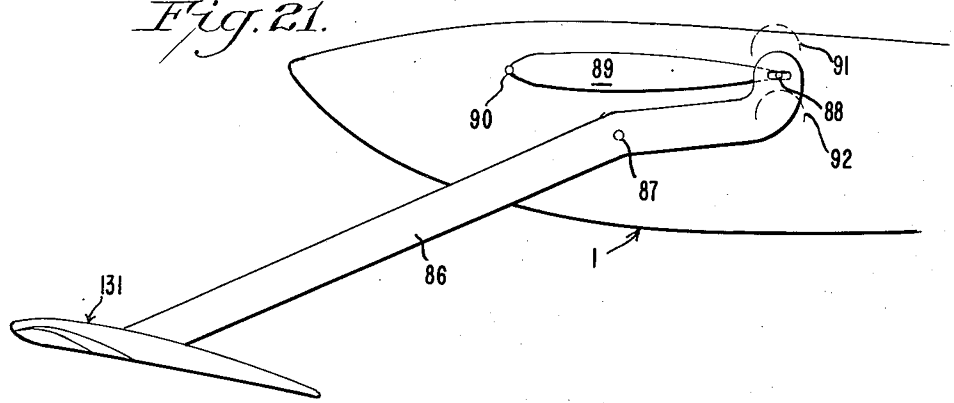
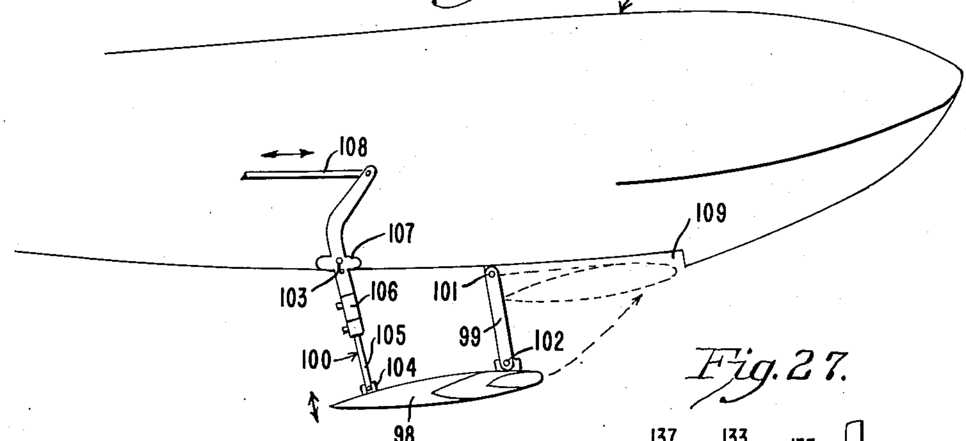
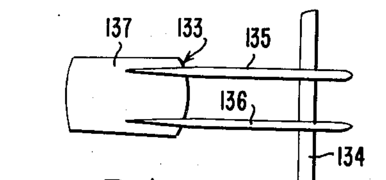
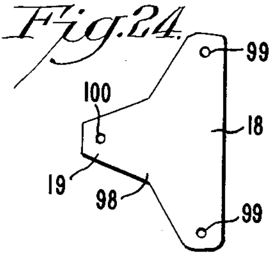
Fig. 28.
137
136
134
138
97
139
85
INVENTOR
HAROLD E. FOLLETT
BY C. H. Mortenson
ATTORNEY Feb. 28, 1961 H. E. FOLLETT 2,972,974
HYDROFOIL CRAFT
Filed July 23, 1956 8 Sheets-Sheet 8
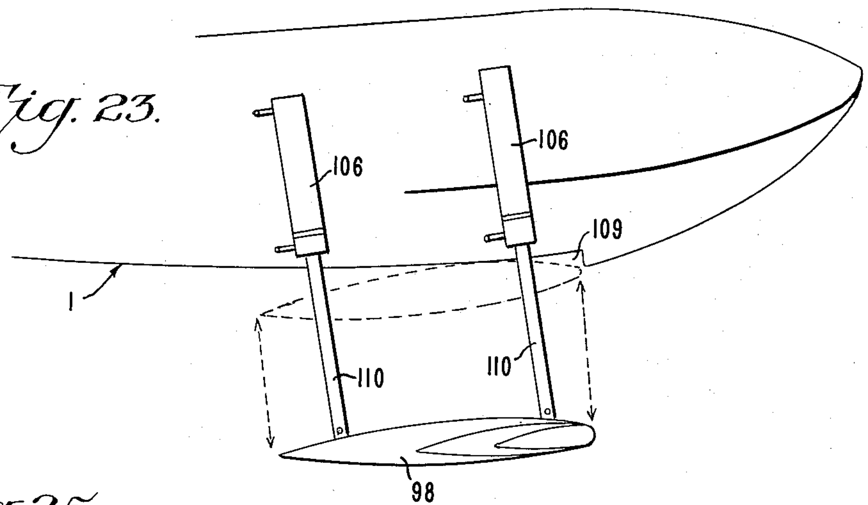
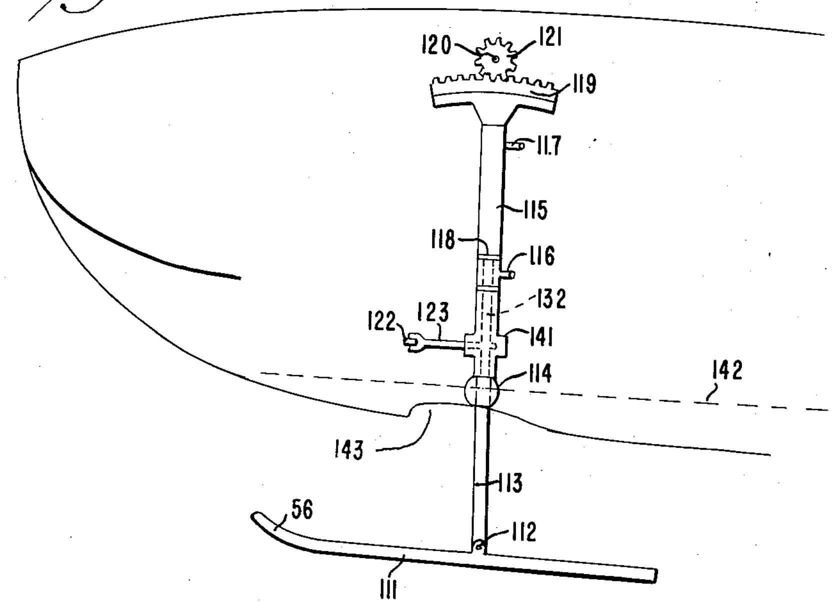
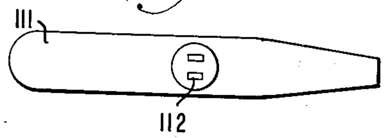
INVENTOR
HAROLD E. FOLLETT
BY C. H. Mortenson
ATTORNEY 2,972,974
Patented Feb. 28, 1961

2,972,974

HYDROFOIL CRAFT

Harold E. Follett, 100 Reamer Park, Wilmington, Del.

Filed July 23, 1956, Ser. No. 599,457

5 Claims. (Cl. 114—66.5)

This invention relates to craft capable of traveling at high speeds over, through or on the surface of water or on other surfaces. More particularly, it relates to a new device for lifting and supporting such craft in a highly efficient and safe manner permitting high speeds and increased maneuverability.

Heretofore, hydrofoils have been completely submerged foils, ladder-type foils or surfaces breaking V or U shaped foils. The efforts directed toward these types have been mainly on the production of a design which would keep the hydrofoil at some depth and prevent it from rising beyond that depth or to the surface.

An object of this invention is the provision of a new kind of foil that incorporates the features and effects of the water-ski into the foil. A further object is the provision of a new lifting and supporting device. A still further objective is the incorporation into the hydrofoil of air-foil principles and structures to obtain maximum lifting and support. An additional objective is to provide a new kind of foil which will by-pass debris in water. Other objects will appear hereinafter.

These objects are accomplished by the hydroskifoil of this invention. This new device comprises an element which function is a support, a hydrofoil and hydroski. The device provides a support having a broad surface for foil contact with the water in the lifting stages and a small, point-approaching, or tapering surface for support contact with the water after the lifting stage is accomplished. This invention provides devices by which a single craft can function as several different types of boats. For example, depending upon speed and upon the position and the type of device being used, a craft can function as a displacement boat, as a conventional planing boat, as a step-hydroplane, as a hydrofoil boat or as a hydroskifoil boat. The user will operate the craft in the fashion he desires depending upon the weather, water conditions and similar factors. This invention provides devices that provide for supports having decreased or minimized contact areas as speed increases. With increasing speed the wetted surface is decreased by effected decreases in width and/or length of the support. Smooth and fast riding crafts are attained.

The new device of this invention and the objectives above will be better understood by reference to the drawings and the further description below:

In the drawings:

Figure 1 is a side view of craft equipped with hydroskifoils of this invention, showing the riding relation of the craft to the water level;

Figure 2 is a plan view of the craft and equipment shown in Figure 1;

Figure 3 is a plan view of one form of a device coming within this invention, this form being given in developed form before folding the various panels into position;

Figure 4 shows representative cross-sections taken on a line such as 4—4 in Figure 3 to illustrate various airfoil forms of component sections;

Figure 5 is an end view of a device of Figure 1 with the parts assembled or folded into position;

Figure 6 is a plan view of the lay-out, or developed view, of a device providing for adjusting the angle of certain of the hydroskifoils of this invention;

Figure 7 is an end view of the adjusting device in folded position;

Figure 8 is an end view of another hydroskifoil of this invention;

Figure 9 is a side view of the device of Figure 8;

Figure 10, in plan views *a, b, c, d, e, f, g, h, i, j, k,* and *l,* shows various shapes of hydroski sections or combinations of skifoils which may be used in this invention;

Figure 11 is a perspective of a stern hydroskifoil of this invention;

Figure 12 shows, in a front view, a hydroskifoil device of this invention having means for mounting accessories, such as a wheel to it and hence to the mobile unit;

Figure 13 is a side view of the hydroskifoil shown in Figure 12;

Figure 14 illustrates an ice-runner accessory;

Figure 15 is a front view of a craft equipped with another skifoil of this invention;

Figure 16 is a diagrammatic view of the functions of device of Figure 15;

Figure 17 is a detailed plan showing of a steering mechanism and a brake mechanism which are suitable in this invention;

Figure 18 is a detailed side-view showing of the brake mechanism;

Figure 19 is a view looking toward the stern to show in more detail the operation of the brake mechanism of Figures 17 and 18;

Figure 20 is a side view of rudder which may be used on the devices of this invention;

Figure 21 is a side view of a vessel equipped with a feeler control comprising a coaction of hydroskifoil and a pivotable air wing;

Figures 22 and 23 show two retractable skifoils;

Figure 24 shows a plan view of the skifoil used on the apparatus of Figures 21 and 22;

Figure 25 shows a retractable, pivotable hydroskifoil of the type shown in Figure 15;

Figure 26 is a plan view of the skifoil used on the device of Figure 25;

Figure 27 is a plan view of a new type of craft equipped with the hydroskifoils of this invention; and Figure 28 is a side view of the craft of Figure 27 shown in riding position.

Referring to Figure 1, there is shown a boat 1 which, for purposes of illustration, is driven by propeller 2, mounted at the stern. The recessed portion 3 in the boat provides space for equipment and passengers. While the devices and principles of this invention may be applied to any craft, the boat shown has a broad bow and a more narrow stern, tapering from the former to the latter as shown. The bottom is flat, the upward sweep at the bow 4 being a gentle, gradual curve, and at the stern is break or steps 97 followed by an upward sweep 5 in about the same degree as at the bow. As shown in Figure 2, there is a cross-bar, wing or strut 6 at the bow and one 7 at the stern. At or near each end of bar 6 there is mounted a hydroskifoil 8 of this invention and at or near each end of strut 7 there is mounted a hydroskifoil 9. While hydroskifoils 8 and 9 are constructed on the principles of this invention, it is generally preferred to use different designs in the bow and stern skifoils, for, generally, only one skifoil will be used in the stern. As shown in Figures 1 and 2, elements of the steering control may be placed in the cock-pit or recessed portion 3. For example, the unit supplying power, such as motor 10, and the take-up bar 11 may be positioned there as well as the power unit 12 for retracting release bar 13. Each hydroskifoil may be equipped with an adjustable member 14 and the bow hydroskifoils are generally provided with a spray deflector 15.

Referring to Figure 3, one form of this invention may be conveniently constructed from metal by stamping out the device in a flat form and shaping it into the desired body form. The panel 16, for example, may be readily die-cut from steel, aluminum, plastic and other materials. Section or panel 17 is constructed so that it has a broad surface 18, which in the mounting of the device of this invention is in the fore position, and so that it has a narrow surface 19, this section being in the aft position. Dotted lines 20 and 21 are fold lines along which the connectors 22 and 23 are folded. Connector 22 acts as a hydrofoil and as a strut; connector 23 acts in the main only as a strut. At the end of each of these plates are openings 24 which may be used to connect the device to the hull of the boat. The end-most section 25 of foil/strut 22 is folded upwardly on line 26 to make the desired connection. Section 27 of the panel 16 when in the folded position constitutes a spray deflector 15. Part 28 of section 27 is folded along dotted line 29 so that it is approximately horizontal and at right angles to the remaining vertical portion 30 and extends away from the center portions of the device or the plate 17. As shown in Figure 2, the horizontal section 28 of the deflector is positioned toward the hull. Any spray flying upwards from the action of the hydroskifoil toward the hull is deflected downwardly, by element 15.

In Figure 1 it can be seen the spray deflector 15 and plate 28 ride in the air above the hydroski section 19. This deflector section prevents spray from flying upward and into the boat or machine above; it also gives additional lift because of its air-foil construction and because of the impact of the spray on the side of the deflector nearest the water. While there is some lifting effect on the vehicle, the amount is generally not sufficient to be of use and, in fact, the spray deflector may be dispensed with on many forms of this invention.

Some typical air-foil sections are shown in Figure 4. Other types may be used if desired; for example, only the initial taper at 31 need be used, and if the end taper 32 is eliminated the structure is uniform across most of its width.

As noted in Figure 5, which is an end-view of the skifoil of Figure 3 after assembly, the strut 23 rises vertically to the hull, whereas the hydrofoil 22 is inclined to fold-line 26, section 25 then rising vertically to the hull. While such positioned holes 24 may be used to fasten the device of this invention to the boat, it is generally preferred to anchor the device to the boat through an adjustable member 14 shown in Figures 1, 6 and 7. This device 14 comprises a substantially right-angled member having holes 33 and slot 34 drilled in its side 35 and holes 36 drilled in its top 37. One such adjustable member is fixed to the strut 23 and one to vertical section 25 of the hydrofoil 22 by means of bolts or similar elements. The openings 36 are used to attach the entire unit to the vehicle or boat. By use of bolts or the like meshing and running through openings 24 in the hydroskifoil and the opening 33 and slot 34 in the member 14, any desired mounting of the hydroskifoil can be attained. An end view of the device ready for use is shown in Figure 7. While a unitary adjustable member affording anchoring means to both the strut and section 25 can be used, it is more frequently desired to use separate ones for the devices of this invention can then be used more readily on variously shaped boats. Slot 34 affords great adaptability, for in the use of the device of this invention on a particular boat one will determine the effects he wishes and the speeds and ski angles involved to get such effects.

Shown in Figure 1 is a device of this invention riding on the ski-portion 19, the water being designated as 38. As shown there, the adjustable member 14 is set, by bolt 39 about one-half way down the slot 34, pivoting being about a bolt or rivet at 40. Knob 124, shown in Figure 3, is provided in section 25 for marking settings. By varying the setting, the angle or the ski-support/foil, sections 19 and 17, to the surface of the water may be changed considerably. The desired tilt may be determined. For example, it may be established that with a given boat the setting should be such that the ski-support is in the at-rest position at an angle of 12°, such a setting with the boat's speed of 15–25 m.p.h. giving sufficient lift to remove the boat from the water and to effect the riding on the last one-sixth or so of the ski. The area of the ski involved depends on speed among other factors and may be as high as one-half of the ski area or as little as one-sixth or so. Thus, one can adjust the device of this invention to lift, speed and smoothness of ride. Depending on the craft, its speed and other factors, angle settings of the skifoil may be 5°–15° to the horizonal, the speeds being from 10 m.p.h. upwards.

The adjusting member 14 has two sections, one panel having a contour adapted to match the contour of the craft to which it is to be attached and the other panel having a contour adapted to match the contour of the hydroskifoil or its strut to which the adjuster is to be attached. In some instances the first panel may be dispensed with and the adjusting member can be made a part of the strut or connector of the skifoil. Thus, the stationary pivot point 33 and sliding range 34 can be provided in uprights such as 23 and 25. It is also possible to employ only one connector, as for example, an extension of a portion or all of rib 43, and in that event, only one adjusting means is needed.

The adjusting member 14 may also be adapted to serve as a steering mechanism. A slot and pivot point comparable to slot 34 and pivot 33 are provided also in panel 37. Horizontal movement to the right or left as well as vertical tilting is attained. Such an adjustable member may be used in the stern or bow for steering purposes.

Figure 8 shows another form of this invention. In this end view there are two struts or connectors 23 that are used in fastening the device to the hull. While these are not in the exact vertical, their uprightness is such that they function very little, if at all, as hydrofoils. Deflector 15 is usually provided as are adjusting members 14. The support and ski in this embodiment have the same fundamental shape as shown in Figure 3, but in this the support plate is not as long and the ski portion is not as tapered. A design such as that shown in Figure 10*b* may be used. As shown in Figure 9, in front of the struts 23, are hydrofoil 41 which acts as a stabilizer. Planer 42, also in the forward position, also acts as a hydrofoil. The entire device is mounted to the hull directly, to an element 14 fixed on the hull or to a strut fixed to the hull so that the hydrofoil 41 is directed away from the center of the vessel and planer/hydrofoil 42 points in a direction toward the center of the vessel. As before, a device is mounted on starboard and one on port side, but in the stern position generally only one hydroskifoil of this invention is used, it being mounted in a center position. Normally, each of the devices of Figure 8 is mounted so that its planers 42 point toward each other. The distance between these will depend upon the boat size and the planers may touch or be joined. That is, the two bow devices may be made as one unit and there can be an elimination of struts, preferably those not carrying a deflector 15 should deflectors be wanted. If desired, the support base/ski unit may have fixed to or as integral part thereof a rib 43 as shown in side-view on Figure 9; this acts as a strengthening member. Such ribs may also be used on the skifoils of this invention which pivot only in the vertical plane; those that pivot in the horizontal plane may have ribs mounted internally to prevent disruption of the air-foil.

Stabilizer 41 may be in the same plane as the support base-skit unit (panel 17 or elements 18 and 19) or it may be at a slight angle thereto; for example, it may be at an angle 10° to the horizon, but preferably no more than 5°. It functions to give more lift in the initial stages of the rising, to permit air seepage at controlled rates and to give lift in the final stages when it functions as an airplane wing or foil; the vacuum created on the top side of elements 41 and 42 provide most of the lift. The hydrofoil 41 also acts as a stabilizer, for if there is a tilting of the vessel one of these, depending on the direction of the tilt, comes into early contact with the water stabilizing the vessel.

Shown in Figure 10 are a number of ski or skifoil shapes which can be used in this invention. Those shown in *a* through *i* are representative of hydroski sections 19 that can be used in conjunction with foil sections 18. Those shown in *j*, *k*, and *l* are forms in which the sections 18 have been considerably shortened. In general, the purposes of this invention are accomplished by the provision of broad surfaces in the initial lifting which surfaces, as lifting progresses, loose contact with the water, presenting as they do so other surfaces less broad which in the final riding stage are, in the main, ski-surfaces as opposed to the initial hydrofoil surfaces. Configurations *h* and *i* are hydroski sections useful in carrying heavy loads; as shown in *g* the ski section may be separated into two ends, or more, if desired. In the given selection of a design, whether a smooth tapering, as in *b* or *c*, or whether a break-tapering as in *a*, will be used depends, of course, to some extent on the weight and design of the craft above the skifoil. The various configurations shown may be used on the stern skifoil also, and bow and stern skifoils need not be all of the same design.

The hydroskifoil that is center-positioned in the back may have a shape similar to that given in Figure 11, a perspective view. The struts sections 44 again may be equipped with adjustable members 14. Sections 45 act as hydrofoils and support base 46 which provides the broad lifting, foil-surface 47 and ski portions 48 are generally of the same size and shape as provided in the devices used forward and a supporting rib 43 may be supplied. As shown, there are two strut sections 49 between the hydrofoils sections 45 and the base/ski element 46/48. To these, by way of drillings and bolts 50, axles, wheels, ice runners and similar devices, may be attached. As shown in Figure 11, there are attached two additional lifters or stabilizers 51. If desired, the hydrofoil sections 45 may continue in their downward inclined path and join each other in the form of a flat-bottom U, the flat section being the base/ski element. At or near the bottom-most point of such a unitary hydrofoil there may be mounted supports extending to and attached to the ski/base or to the hydrofoil section to receive such an element as stabilizer 51. Generally, it is preferred to use the double strut arrangement for the ready attachment of accessories which make possible the speedy conversion of a water-going vessel to a land or ice vehicle.

The attachment of accessories such as wheels is readily accomplished with bow hydroskifoils such as device 52 shown in Figures 12 and 13. As can be seen axle 53 is mounted to receive wheel 54 and to be held in place by passing through drillings through strut sections, such as 49, through connectors such as 23 or hydrofoils such as 22 and through ribs such as 43, depending on the device being used and the presence or absence of these elements. Bearings 125 may be provided and bolts or pins 126 hold the accessory in position. The front hydroskifoils can be easily equipped for receiving such accessories, as for example, by mounting in holes 55 in the strut of the hydroskifoil shown in Figure 3. Ice runners such as device 127 shown in Figure 14 may be mounted by drillings 128 and bolts 50.

One embodiment of this invention comprises a combination of the skifoil of this invention with a wheel. A craft equipped with wheels for land travel, for example, bears the wheels in close proximity to the hydroski section. It is driven into the water for use as a boat. Upon completion of the lifting and ski stages, the vehicle rides on the stern wheel much the same as though the wheel were running on a solid surface.

The device 52 shown in Figures 12 and 13 has certain advantages over hydroskifoils previously discussed. The connectors 23 are slanted so that the ski section 19 is positioned directly under the wing-bar or strut such as 6. Thus, the support section, planer and hydrofoil units are forward of the wing-bar and the ski section is no longer aft of it but is positioned so that the center of the wing-bar and the riding area when the ski contact only is operating are in approximately the same vertical plane. With this alignment, the upward pressure of the water on the hydroski section and the negative lift of the wing-bar or strut are substantially in the same vertical line; great stability at high speeds is attained.

Another embodiment of this invention is shown in Figure 15 showing a front view of a boat equipped with hydroskifoils within this invention. In this instance the support base-ski element described above is modified in that at its front section an upper curving section 56 is provided. With this upturn the element has the characteristic ski shape. However, the device is used as a hydroskifoil. It is pivotably mounted to the boat by and through supports 57 through which pivot means 58, hand or power driven, runs to the skifoil. In the starting and early running stages the skifoil is in the position shown in Figures 15 and 16. The long edge of the skifoil is plowing through the water presenting much surface and providing the desired lift. In other words, the skifoil is acting here in its hydrofoil capacity. In the later and final stages the skifoil is pivoted turning approximately 90° so that the curved sections are in the foremost position and the skifoil is functioning as a hydroski. This is depicted also in Figure 16 in which the arrow indicates the direction of the boat; the solid lines position 59 indicates the hydroskifoil functioning as a hydrofoil; and dotted line position 60 indicates the hydroski function, the pivoting on 58 being roughly 90°.

The embodiment shown in Figure 15 may be equipped with shock absorbers 61. These are preferably contained inside the support 57 along with the pivot means. However, an advantage in external mounting is that shock may be absorbed on sides or in the back or placed where trial indicates best. The absorbers may include screw element or similar means for adjusting the amount of play in the absorber. It is also possible to construct the support base-ski so that the back half of it, the ski position, is hingedly mounted to the front portion. The hinge can, for example, be located at 140. By the combination of the hinged mounting and the shock absorber attached to the pivotable section, the devices of this invention can be made to accept roughness in the water without making a rough ride. In other words, the effect of waves will be taken up by the hinged section and its shock absorber.

The steering mechanism for the mobile units referred to above, such as that shown in Figures 1 and 2, is given in detail in Figure 17. The cross-bar or strut 7 is pivotably mounted on top of the vessel. At 62 is the stationary pivot point while at 63, by means of slot 64 and capped bolt 65, is the sliding pivot permitting turns to the right or left. Capped bolt 65 is stationary and may be used also to lock the strut 7 into a given position. At 10 is a means, hand or, preferably, power driven, for driving one end of the cross-bar 7 toward or away from the element 10 as desired. To illustrate, element 10 may be a motor, electrically driven or controlled, which causes screw element 66 to turn driving further into or out of meshing element 67 which is attached to cross-bar 7 as shown. Arm 11 is fixed to support plate 69 which in turn is fastened to bar or strut 7. Since screw element 66 is fixed against longitudinal movement and element 67 is free to move, the clockwise or counterclockwise movement of the screw determines whether the end of cross-bar 7 comes toward it or goes away from it. The opposite end of 7 will, of course, turn in accordance and the stern hydroskifoil shown in Figure 11 will turn as desired. Figure 11 shows the openings in wing 64 for the slotted and 68 for the stationary pivot points.

The arm 11 can be attached directly to cross-bar 7 but generally it is preferred to attach it to a support plate 69 fastened to the strut 7 since this plate can be used to support elements of the brake mechanism.

This brake device comprises a hand or power unit 70 which on activation drives arm 71 a short distance toward the bow as shown by the arrow. Fixed on cross-bar 7 is a support plate 72 which contains three uprights 73 containing holes adapted to support arm 71 and rods 74 and 75. As shown in Figure 19, on the ends of these rods within the housing formed by support mechanism 72 are eye-lets 76. Arm 71 passes through these while it is in the unretracted position and movement of rod 74 or 75 in the directions shown for them is restricted. The other end of rod 74, and likewise rod 75, passes through an aperture in support plate 69, is then bent downwardly and pinned through the hydroskifoil through aperture 77 in adjusting member 14 and aperture 78 on the hydroskifoil. Between the upright of plate 69 and the downward bend of rod 74 is an expansion spring 79. When arm 71 is withdrawn sufficiently toward the element 70, rods 74 and 75 are freed, and expansion springs 79 immediately bear against the outside, downward portion of arms 74 and 75, respectively, and cause them to move outwardly releasing the pinned effect. This movement is shown in Figures 18 and 19.

As will be noted in Figure 18, the adjusting member 14 is not bolted fast in slot 34 as previously, the mountings at pivots 80 and 81 being sliding bolts or rivets adjusted for ready pivoting and for holding elements 14 and the strut sections 44 together. Thus, with release of the pin, gravity and water cause the skifoil to change angle immediately, as shown by the riding position (solid line 129) going to the braked position (dotted line 130). The skifoil submerges causing more drag, and the vessel is slowed to permit smooth passage over rough water or for other purposes. While at a high speed riding level the angle of the skifoil to the water level may be 5° to 20° while after the braking effect is applied it is −3° to +4°. After the need for braking has passed, the elements may be again placed in pinned or riding position by hand or power driven means.

The hydroskifoil shown in Figure 15 has a distinct advantage in that braking is very easily accomplished by the pivot mechanism 58. Thus, if one wishes to have the hydroskifoil function more as a hydrofoil and less as a hydroski, he merely reverses the action and direction shown in Figure 16 with a resultant slowing down of the vessel. By so doing, the operator can regulate the mobile unit to function as the type of craft he desires at a given time as described above.

As shown in Figure 20, the stern hydroskifoil may be equipped with a rudder 82. This is pivotably mounted on the bottom strut sections 49 at 83. A spring or any suitable retracting means 84 is anchored to the hydrofoil section 45. As the vessel travels in the water, the rudder or fin 82 will ride over any debris without being damaged. This rudder-fin acts as a rudder which is a steering means and it acts as a fin to prevent side-slipping. Solid debris objects will force the fin up and after the vessel passes such objects, the action of the retracting unit 84 will force the rudder down into the water 85 shown at high speed riding level. The mounting enables the rudder to be kept free of weeds and other debris. Two such rudders can be mounted, one on each strut 49.

Any of the devices of this invention may be mounted for retraction into the hull of the vessel, into a pontoon, wing or the like. The pivoting hydroskifoil shown in Figure 15 is particularly well adapted for retraction. The lowering and rising may be accomplished manually or by power such as electricity, pneumatic or power from an internal combustion engine. The retraction permits ready beaching of the craft and facilitates its conversion into land or other such vehicles.

This can be shown by reference to Figure 21 which also illustrates an air-wing regulator. In this modification, the hydroskifoil 131 may be any of the various ones depicted herein. It is mounted to vessel 1 by support 86. This support can be constructed to retract as a unit or telescope together, as described below, to draw hydroskifoil up to and within vessel 1 or it can pivot as a unit or in sections to move element 131 backwards and upwards. As shown in Figure 21, the support is fixed to vessel 1 at stationary pivot point 87 and at sliding pivot point 88. Also at 88 the air-wing 89 is pivoted for up and down movement with support 86. The air wing is pivoted also at 90, a stationary pivot point. Thus, the hydroskifoils raise the boat completely out of the water and as the hydroskifoils ride on the water, the air-wing or air-wing and the skifoil support the hull. The majority support is by air alone and the hydroskifoils act as feelers for adjusting the air-wing to the proper angle for traveling or flying at a given height above the water. Depending upon the action of waves or speed or the like, the hydroskifoil may move downward or upward. With a downward movement, air-wing 89 moves to some position such as shown by dotted lines 91 while with an upward movement of element 131, the air-wing goes to a position such as that shown at 92. This provides for an accurate control, for an increased lift by an upward angling of air-wing 89 can be obtained when desired, for example, to ride over a wave. The vessel can be equipped with the same type of air-wing and control at the stern and the pivoting mechanism is not limited to that shown. Thus, the support 86 and air-wing 89 can be separated by a slotted, pivotable bar or the support 86 can pass around above air-wing 89 to pivot point 88 rather than under as shown. Further, hydroskifoil 131 may be mounted on a support 86 which is retractable, as for example, an arm telescoping within itself. The struts or cross-bars 6 and 7 in the device shown in Figures 1 and 2 may also be pivoted for angling. Each of the back edges shown in Figure 2, 95 and 96, may be free to move up into the air or down into a recess in the hull (not shown) while fore edges 93 and 94 are fixed to the hull for stationary pivoting, much like a hinge, or the edges may be reversed in their action. In any of the air-wing modifications each wing may be independently controlled by its own hydroskifoil. The skifoils may be replaced with wheels, ice-runners, snow skis or the like and any of these can function as feeler controls.

Reference has been made to air-wings, cross-bars or struts 6 or 7. While these are very useful in some forms of this invention, they are not necessary or desired in other forms. For example, in Figure 22 there is shown a hull equipped with retractable skifoils underneath the hull both in the operating and non-operating positions. The skifoil 98, having the shape shown in Figure 24, generally has struts 99 mounted at both ends in the fore position and one in the back 100; however, a lesser number of struts may be used. Upright 99 is pivotably mounted at 101, at the fastening to the hull, and at 102, the fastening to the skifoil.

Similarly, the back strut 100 is pivotably mounted at 103 to the hull and at 104 to the skifoil. The upright 100 in the back comprises a shaft 105 which can be driven into or out of sleeve 106 by any means such as a hydraulic lift. These means provide for angle adjustment and shock absorbing, the back end of the skifoil riding upward toward the hull or downward toward the water, depending on the effects desired. The strut enters the hull through packing 107 at pivot 103 and is connected by bar 108 to a hand, mechanical or electrical control (not shown) for retracting the skifoil. Upon movement of the bar 108 toward the stern, the entire device moves so that the skifoil 98 is brought up directly under the boat at the step 109. In this retracted position the boat acts as a step-hydroplane. As can be seen all the supports or controls 99 and 100 shift forward and upward to the inactive position shown by the dotted lines.

In another modification shown in Figure 23, the skifoil 98 is equipped at both the front and the back with hydraulic, or similarly activated, retractors 110. These upon activation, as by hydraulic means, can be moved up and down into the position shown by the dotted lines in the step 109 in the boat or into the riding position shown by the heavy lines. The angle adjustment that is desired in the skifoil can be easily obtained since the front retractor can be extended to a greater or a lesser amount than the back retractor, or with the front retractor set in the given position the back retractor may be extended to a greater or lesser amount than the front or vice versa.

In Figure 25 there is shown a hydroskifoil on the type given in Figure 15 that has been adapted for retraction and pivoting. The skifoil 111 has the shape shown in plan view Figure 26 and has air foil cross sections such as shown in Figure 4. At 112 the skifoil is hingedly mounted to shaft 113 which extends into the hull through joint and packing 114 and up into a hydraulic cylinder 115. This hydraulic cylinder is equipped with an intake pump 116 that raises the shaft 113 and skifoil as shown by the dotted lines 132, and the cylinder is equipped at 117 with a pump which forces the shaft 113 and thence skifoil 111 down, the pressure bearing on piston head 118.

At the end of hydraulic cylinder 115 it is joined, as by a welding or screw joint, to a gear rack 119 that moves forward or backward upon activation through the power shaft 120 and intermeshing gear 121. This backward and forward movement causes the entire assembly to move backward and forward with attendant effects on the position of the skifoil 111. Hydraulic or other means equivalent to the gear device may be used.

In order to get the skifoil to change from its function as a foil to its function as a ski as shown in Figure 16, a hydraulic control is attached at 122 to act about shaft 113 with the movement of arm 123 in the horizontal plane. Arm 123 fits into or around shaft 113 through collar 141 and shaft 113 has a key-way into which arm 123 fits. Thus, in any vertical position arm 123 when activated can cause shaft 113 to rotate 90° or more if desired, in the horizontal plane. The desired 90° turn of the skifoil 111 is effected. The hinge 112 permits the ski to be self-adjusting to the water when the boat is moving. The skifoil is both pivotable and retractable. The craft may have the boat line shown at 142 but preferably the hull contains recessed portion 143 into which the hydroskifoil fits on retraction. Prior to raising shaft 113, hydroskifoil 111 is turned 90° from the position shown in Figure 25 so that it fits into step 109 if such is provided and the size and location of the step require the pivoting. If no such recess is on the craft, the hydroskifoil may be raised with or without pivoting and brought into close proximity to the hull.

In Figure 27, a plan view, there is shown a skifoil boat 133 that minimizes air resistance. It comprises a front cross-strut 134, twin hull extensions, 135 and 136, and middle aft hull section 137. In Figure 28, a side view, there is shown the device of Figure 27 equipped with front or bow skifoils 138 and stern skifoil 139; these skifoils may be any of those described above. This boat may be provided with step 97 which minimizes suction of water on the back end of the boat while it is in the water and which creates negative air-lift while the mobile unit is out of the water to attain greater stern stability. The craft may be power driven in any desired fashion. The hull weight in this craft is reduced where buoyancy is not needed and the upward pressure under the front of the craft is decreased. As shown the craft rides on water level 85 with the contact area on the ski sections minimized. High speed travel is attained. The craft shown in Figures 27 and 28 may have only one hull extension centered in hull section 137. If an inboard motor is used with a water propeller, hull section 137 is moved forward and single or twin hull extensions project aft for support for hydroskifoils, propeller shaft, rudder and the like, the cross-strut 134 remaining in front.

By this invention a vehicle or craft can be readily adapted for travel on solid and liquid surfaces and when propeller driven such as the device in Figure 1, the craft can be air-borne even to a complete extent if desired. The various bodies to which the devices of this invention may be attached can be easily placed in water or landed. In travel on water, exceedingly high speeds are obtained and many solid obstacles in the water such as weeds, logs and the like, can be by-passed very readily without damage to the device of this invention or to the bodies to which they are attached. The devices can be used in conjunction with catamarans, airplanes, airboats, boats, pontoons, water sport items, as water skis, aquaplanes and surf boards, hydroplanes and the like. Exceedingly high speeds can be obtained. For example, at high speeds the craft of this invention are riding, for example, in water, on the very last portions of the skifoil and there is very little resistance to the forward-going motion of the craft and the body may be driven with very high efficiency. Surprisingly, the crft equipped with the devices of this skifoil invention are very stable. As described above any excessive lift by the skifoil can be readily counteracted by a desired down or negative lift of a wing bar or by other brake mechanisms.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. An arrangement comprising a watercraft and a device operatively connected to said watercraft for lifting and then supporting said watercraft above a water surface, said device comprising a unitary support inclined downwardly and rearwardly with respect to said watercraft and made up of a first and a second support section, said first section being a hydrofoil surface which is submerged below the water surface at low speeds and spaced above said surface at high speeds, said second section being a hydroski surface which is in contact with the water at such times when said craft is supported by said water and which is disposed rearwardly and downwardly of said first section, said second section being of less transverse dimension than said first section.

2. An arrangement in accordance with claim 1 in which the said second section is tapered, the most narrow part thereof being most rearwardly.

3. A device in accordance with claim 1 in which said sections are of air-foil shape in cross-section.

4. A device for lifting and then supporting watercraft above a water surface and being a ski capable of acting as a hydrofoil and as a hydroski in operative contact with said craft, said device comprising a ski having the characteristic shape of a water ski with the usual upwardly curved section at the front but having an air-foil shape in cross-section, being non-uniform in thickness, said ski having near its center a connection for pivotably mounting said ski to said craft, said ski in the lifting stage being submerged below the water surface and presenting foremost a long edge of said ski, being the leading air-foil edge thereof, and said ski being then turned approximately 90° being positioned with said curved section in the foremost position above the water and with the water-surface contact rearwardly being a ski-surface contact on the water.

5. A device in accordance with claim 4 in which said ski tapers from the wider front curved section rearwardly to a narrow end section.

References Cited in the file of this patent

UNITED STATES PATENTS

| | | |
|---|---|---|
| 2,073,864 | Brush | Mar. 16, 1937 |
| 2,186,060 | Batey et al. | Jan. 9, 1940 |
| 2,438,493 | Berger | Mar. 30, 1948 |
| 2,625,350 | Ditter | Jan. 13, 1953 |
| 2,703,063 | Gilruth | Mar. 1, 1955 |
| 2,715,000 | Janney | Aug. 9, 1955 |
| 2,751,612 | Shepard | June 26, 1956 |
| 2,795,202 | Hook | June 11, 1957 |
| 2,814,811 | Ritter et al. | Dec. 3, 1957 |

FOREIGN PATENTS

| | | |
|---|---|---|
| 863,288 | France | Jan. 2, 1941 |